United States Patent Office 3,467,405
Patented Sept. 16, 1969

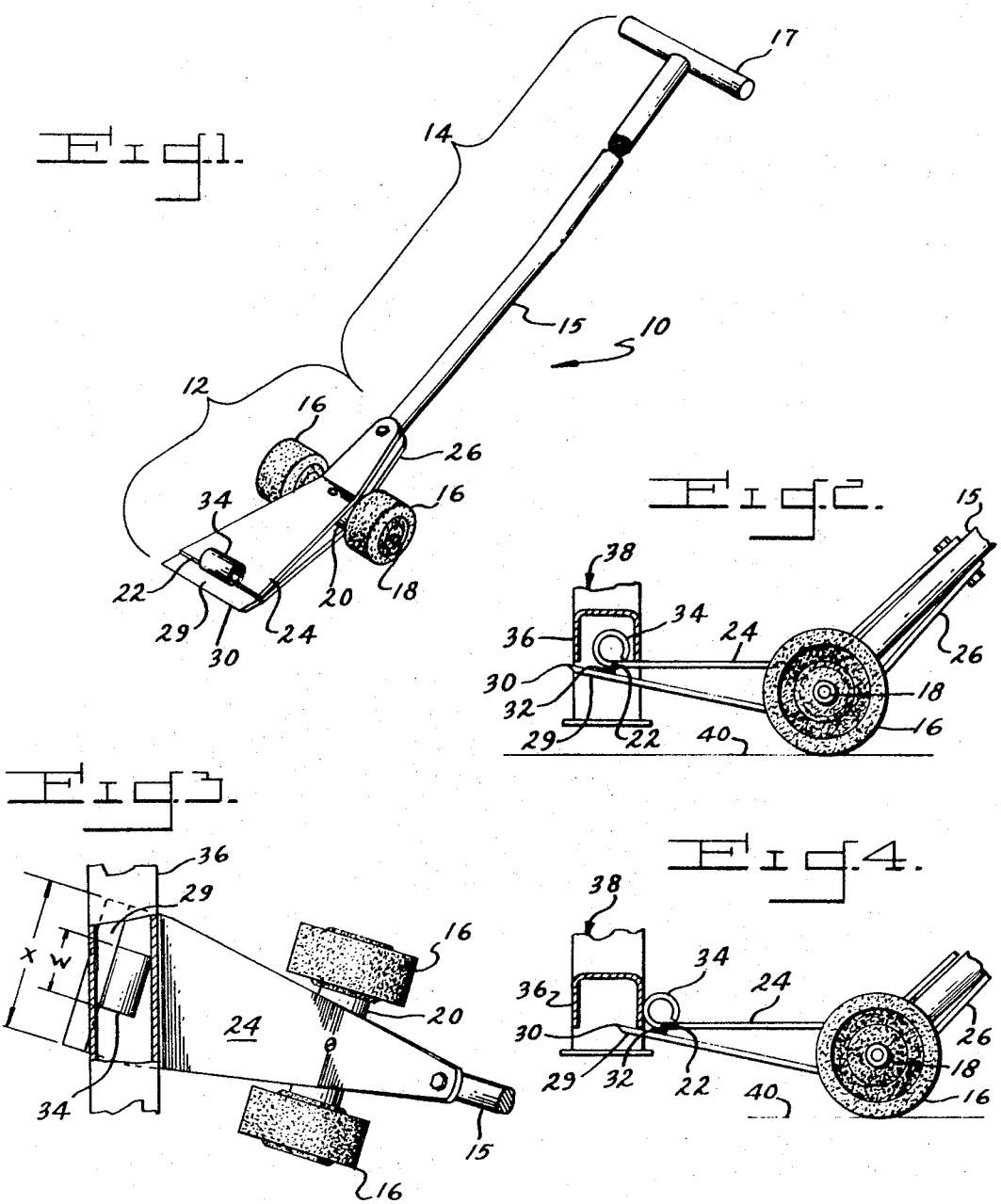

3,467,405
LEVER DOLLY
Walter K. Fogg, 45 Kensington St.,
Feeding Hills, Mass. 01030
Filed Nov. 16, 1967, Ser. No. 683,684
Int. Cl. B62b *1/00*; B66f *3/00*
U.S. Cl. 280—47.24                5 Claims

ABSTRACT OF THE DISCLOSURE

A lever dolly for moving machinery support stands having a carriage portion and a lever portion wherein the carriage portion comprises a pair of wheels mounted on an axle and a pair of carriage plates supported thereby, the lower carriage plate having a portion which extends beyond the upper carriage plate to act as a prying lip and the upper carriage plate having means disposed at the end thereof for engaging support stands so that when engaged said means prevents the support stand from slipping on or falling off of the carriage portion.

---

Heretofore, many lever dollies have been proposed for use in moving industrial equipment. However, as far as is known, all such devices, which have been of the pry bar type, have had disadvantages of one kind or another. For example, the conventional pry bar type lever dolly has been found to be less than satisfactory for moving industrial equipment due to rigid wheel axle design and slippage of the equipment on and from the dolly. While improvements in this area were brought about by the use of swivel axles, such as disclosed in U.S. Patent No. 3,157,411, this materially increased the cost due to the complexity of the device and the problem of slippage was not solved.

It is an object of this invention to provide ale ver dolly specifically adapted for moving industrial machine support stands.

It is a further object of this invention to provide an inexpensive lever dolly of sturdy construction.

It is a still further object of this invention to provide a lever dolly that may be used for prying, pushing and pulling industrial machine support stands without the problem of the stand falling off or slipping on the lever dolly.

The above and other objects and advantages of the present invention will appear from the following specification and appended claims, when considered in connection with the accompanying drawings, in which:

FIG. 1 is a perspective view of the lever dolly of the present invention;

FIG. 2 is a partial side view of the lever dolly of FIG. 1 engaging a machine stand;

FIG. 3 is a partial top view of the lever dolly of FIG. 1 angularly engaging a machine stand; and FIG. 4 is a partial side view of the lever dolly of FIG. 1 engaging a machine stand.

Referring to FIG. 1, the lever dolly 10 is comprised of two portions, a carriage portion 12, and a lever portion 14.

In FIGS. 1, 2 and 3 it will be seen that the lever portion 14 is comprised of a lever arm 15 and a handle 17 at one end thereof. The carriage portion 12 comprises a pair of wheels 16 rotatably mounted on the ends of an axle 18. The axle is secured in a housing 20 which is adapted to receive one end of lever arm 15.

A top carriage plate 24 is affixed to the lever arm 15 and to the top of axle housing 20. A bottom carriage plate 26 is also affixed to the lever arm 15 and the axle housing 20. As most clearly depicted in FIGS. 1, 2 and 4, the bottom carriage plate 26 extends beyond the end 22 of the top carriage plate 24 to form a prying lip 29 with a beveled end 30 for prying purposes. While both plates are bent to form acute angles, it will be noted, that the angle formed by the top plate 24 is somewhat larger than that formed by the bottom plate 26 so that the two plates converge near their outer ends where they are joined by a weld 32. This arrangement causes the bottom plate 26 to reenforce and stabilize the top plate 24.

Means for preventing a machine stand from slipping on or falling off of the carriage portion 12 is provided adjacent the end 22 of the top carriage plate 24. Referring to the drawings, it will be seen that such means is depicted as a knob 34. While the knob 34 is shown as a rolled portion formed from and integral with the top plate 24, it will be clear to those having ordinary skill in the art that it may also be a separate piece affixed to the top carriage plate 24 in a variety of ways. The actual function of the knob 34 will be explained further below.

Referring primarily to FIGS. 2, 3 and 4 the uniqueness of the lever dolly of the present invention may clearly be seen.

As mentioned above, heretofore, lever dollies for moving industrial machine stands have lacked versatility in that pushing, pulling and/or turning movements with the lever dolly were at best complicated by the fact that the machine stand could fall off the lever dolly or slip thereon. By the use of the lever dolly of the present invention this problem has been eliminated.

Referring particularly to FIG. 2, it will be noted that the lever dolly 10 is shown engaging a channel shaped cross member 36 of a machine stand 38. As shown, the knob 34 has been positioned within the channel member 36 so that the bottom of one wall of the channel member 36 rests on the top carriage plate 24. When the knob 34 is so positioned and the machine stand is lifted og a floor 40, or other level surface, the top plate 24 is positioned substantially parallel to the floor 40. While the presence of the knob 34 within the channel member 36 prevents the channel member from slipping off the carriage portion 12 of lever dolly 10 during any pushing or pulling movements, the substantially level surface formed by the top carriage plate 24 insures less chance of the machine stand 38 slipping on the top plate 24 during any moving.

Referring to FIG. 4, it will be seen that the lever dolly 10 may also be used to move a machine stand 38 even if the knob 34 cannot be placed within a channel member 36. By positioning the prying lip 29 under the channel member 36 with the knob 34 outside of the channel member 36, the stand 38 is supported during movement in a shallow crevice formed by the knob 34 and the upwardly angled prying lip 29. Supported in this manner, the machine stand 38 is prevented from falling from or slipping on the carriage portion 12.

FIG. 3 demonstrates how the lever dolly 10 may be angularly positioned to move a machine stand 38, such as when the stand has been placed in a corner and a straight push or pull force cannot be utilized. In this situation, the knob 34 of the lever dolly 10 is placed within the channel member 36 of the machine stand 38. As depicted the knob 34 is of a width *w* which is substantially less than the width *x* of top carriage plate 24. This dimensioning of the knob 34 permits it to be placed and angled within the channel member 36, but not completely rotated therein. With this design, the lever dolly may be used to angularly move the machine stand 38 by binding the knob 34 against the walls of the channel member 36. The binding action plus the level surface provided by the top carriage plate 24 prevents the stand 38 from slipping on the carriage portion 12.

What is claimed is:

1. A lever dolly for moving a machinery support stand constructed of channel shaped members, said lever dolly comprising a lever portion and a carriage portion, said carriage portion including an axle, wheels rotatably mounted on said axle, a top carriage plate disposed above said axle and affixed to said lever portion, a bottom carriage plate disposed below said axle and affixed to said lever portion, said bottom carriage plate extending beyond the end of said top carriage plate and in converging relationship therewith and means adjacent the end of said top carriage plate for engagement with a channel shaped member of said support stand.

2. The lever dolly in accordance with claim 1 wherein said means includes at least one knob affixed to said top carriage plate perpendicular thereto.

3. The lever dolly in accordance with claim 2 wherein said knob is formed from and integral with said top carriage plate.

4. The lever dolly in accordance with claim 3 wherein said knob has a width less than the width of the top carriage plate at the end thereof.

5. A lever dolly for moving a machinery support stand comprising a lever portion and a carriage portion, said carriage portion including an axle, a housing for said axle, a pair of wheels rotatably mounted on said axle, a top carriage plate disposed on top of said housing and affixed to said lever portion, a bottom carriage plate disposed beneath said housing and affixed to said lever portion, and a knob disposed adjacent the end of said top carriage plate and perpendicular thereto for engagement with said machinery support stand, said bottom carriage plate having a portion extending beyond the end of said top carriage plate and said bottom carriage plate being disposed in converging relationship with said top carriage plate and affixed thereto at the end thereof whereby said bottom carriage plate supports said top carriage plate.

References Cited

UNITED STATES PATENTS

| | | |
|---|---|---|
| 1,299,829 | 4/1919 | Goodyear. |
| 1,965,944 | 7/1934 | Lea _____ 280—47.29 |
| 2,568,289 | 8/1951 | Morey _____ 254—8 |
| 2,703,657 | 3/1955 | Hudkins. |

BENJAMIN HERSH, Primary Examiner

J. A. PEKAR, Assistant Examiner

U.S. Cl. X.R.

254—131